(12) United States Patent
Gariepy et al.

(10) Patent No.: US 8,548,646 B1
(45) Date of Patent: Oct. 1, 2013

(54) DISTRIBUTED HARDWARE ARCHITECTURE FOR UNMANNED VEHICLES

(75) Inventors: Ryan Gariepy, Kitchener (CA); Rajan Joshua Gill, Brampton (CA); Patrick William Martinson, Waterloo (CA); Matthew Allen Rendall, Waterloo (CA); Bryan Nicholas Webb, Waterloo (CA)

(73) Assignee: Clearpath Robotics Inc., Kitchener, ON (CA)

( * ) Notice: Subject to any disclaimer, the term of this patent is extended or adjusted under 35 U.S.C. 154(b) by 78 days.

(21) Appl. No.: 13/099,445

(22) Filed: May 3, 2011

Related U.S. Application Data

(60) Provisional application No. 61/282,991, filed on May 4, 2010.

(51) Int. Cl.
*G05D 1/00* (2006.01)
*B60L 9/00* (2006.01)
*B25J 5/00* (2006.01)

(52) U.S. Cl.
USPC .............................. 701/2; 701/22; 318/568.12

(58) Field of Classification Search
USPC ................... 700/245, 263, 297, 9; 701/2, 99; 713/300
See application file for complete search history.

(56) References Cited

U.S. PATENT DOCUMENTS

| | | | | |
|---|---|---|---|---|
| 6,668,318 | B1 * | 12/2003 | Jenkins et al. .................... | 713/1 |
| 2008/0009965 | A1 * | 1/2008 | Bruemmer et al. ........... | 700/245 |
| 2008/0009966 | A1 * | 1/2008 | Bruemmer et al. ........... | 700/245 |
| 2008/0028237 | A1 * | 1/2008 | Knight .......................... | 713/300 |
| 2008/0291879 | A1 * | 11/2008 | Duff et al. ..................... | 370/338 |
| 2009/0160255 | A1 * | 6/2009 | Grady ............................. | 307/66 |
| 2010/0060604 | A1 * | 3/2010 | Zwart et al. ................... | 345/173 |

OTHER PUBLICATIONS

Eric Park, Linda Kobayashi and Susan Lee:"Extensible Hardware Architecture for Mobile Robots" Intelligent Robotics Group, Apr. 18, 2005.*

* cited by examiner

*Primary Examiner* — Thomas Black
*Assistant Examiner* — Tyler Paige
(74) *Attorney, Agent, or Firm* — Perry + Currier

(57) ABSTRACT

A distributed hardware system for unmanned vehicles is provided, comprising a plurality of electronic hardware modules in communication via a vehicle control network. Each module is enabled to: communicate with one another, issue requests for information from a central control module, and transmit data over the network in a common format to perform respective tasks; and at least one of: independently sense one or more of: a respective status of the distributed hardware system and at least one respective environmental parameter; and independently control the respective function of a vehicle. A portion of the modules can enabled to: be removed and inserted from the distributed hardware system as plug and play modules; and determine when at least one of the modules is removed/inserted from the distributed hardware system and transition to a corresponding state. The system also includes a power management system which includes capacity monitoring and hot-swap capabilities.

16 Claims, 15 Drawing Sheets

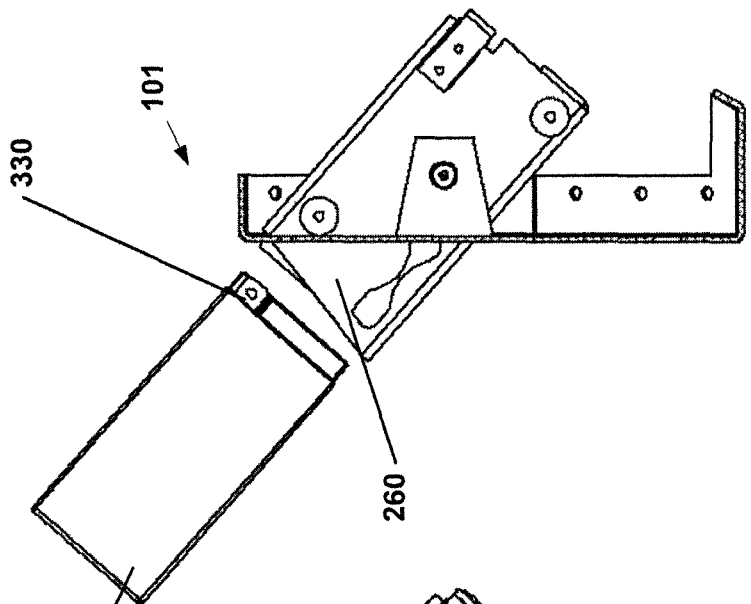
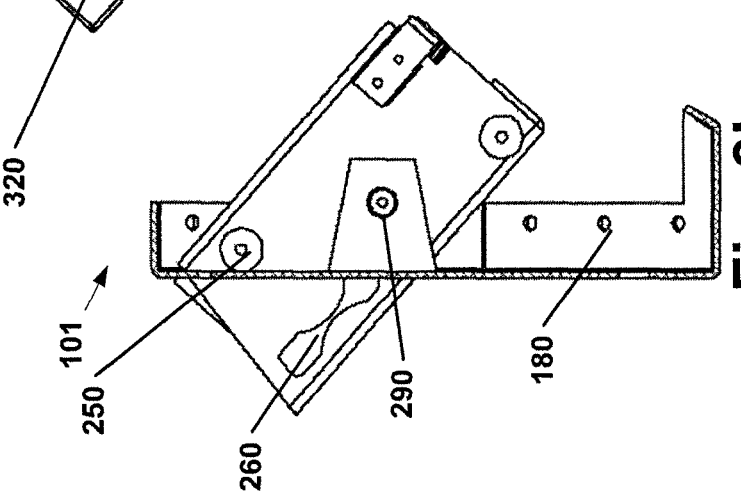
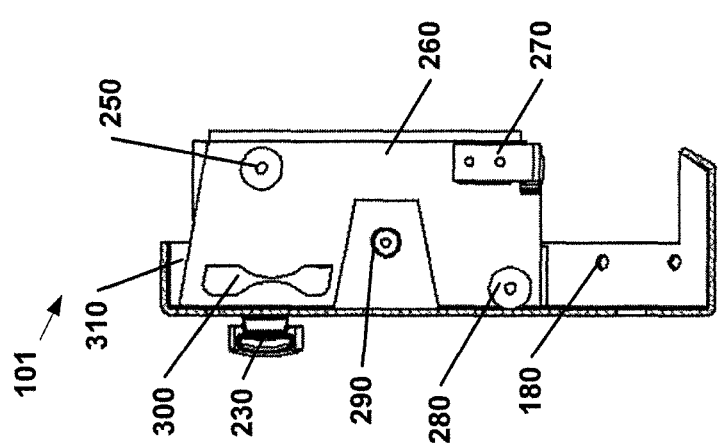

DISTRIBUTED HARDWARE ARCHITECTURE FOR UNMANNED VEHICLES

CROSS-REFERENCE TO RELATED APPLICATIONS

The present application claims priority from U.S. Patent Application No. 61/282,991 filed on May 5, 2010, the contents being incorporated herein by reference.

FIELD

The specification relates generally to unmanned vehicles ("UVs"), and specifically to a distributed hardware architecture which can provide unmanned vehicles with a high degree of reliability and upgradeability.

BACKGROUND

Autonomous unmanned vehicle systems have existed in research labs for decades, and are now seeing increasing use outside of these controlled environments. Systems which were considered reliable from an experimental standpoint are now viewed as quite fragile when they are subjected to harsh environmental conditions and intensive use. They were originally only operated by those who designed them; they are now being placed in the hands of less technically adept individuals. Though many industrial or military grade UVs exist which can operate in such settings, they tend to be prohibitively expensive for most users.

Additionally, these systems were originally developed in a custom or low-production volume manner, where careful attention could be paid to individual units as they are constructed. As unmanned systems begin to be mass-produced, key components will need to be easily upgradable, without requiring major system architecture changes for each improvement. At the moment, the nature of many UVs precludes this. Many fully-closed systems exist wherein upgrades can only be performed by the manufacturer. Likewise, a great number of "modular" robotics platforms and hardware are on the market, but such hardware often requires a significant amount of effort by the user to integrate; they are not "plug-and-play".

It is therefore desirable to implement a hardware system architecture which is robust to failure, easy to use, and easily upgradeable as design improvements are made.

SUMMARY

It is an object of the present invention to increase the robustness and ease of use of unmanned vehicles. As well, it is a further object to allow unmanned vehicles to be upgraded easily by the user, without requiring hardware to be returned to the manufacturer or the user to possess highly technical skills.

The present invention is comprised of an unmanned vehicle platform with a set of components which are known to be applicable by those skilled in the art. These components may include actuators such as DC drive motors, pan/tilt sensor mounts, or standalone manipulator devices. Components may also include sensing modules such as scanning laser rangefinders, passive environmental sensors, inertial measurement units, drive encoders, camera assemblies, and global positioning systems. Finally, computing and communication modules such as processors, memory, 802.11 transceivers, point-to-point wireless control hardware, and hardwired user interfaces may also be included.

Each component is mounted either external to or within a vehicle platform, depending on specific component requirements. Sensors such as cameras or laser rangefinders tend to be mounted externally, while inertial measurement units, drive systems, and computational hardware can be mounted internally. The vehicle platform should be constructed to protect any internally mounted devices from harsh environmental conditions. Methods for this protection are well known to those in the field of electromechanical design.

The platform itself can incorporate one of many possible methods of moving through the environment. It can be an unmanned surface vehicle capable of navigating over water, an unmanned ground vehicle based on an existing manned vehicle chassis, a custom unmanned ground vehicle, or any other type of unmanned chassis known to the field. In an exemplary implementation, the platform is a custom all-electric 6×6 off-road chassis driven by brushed DC motors. However, in other implementations the platform can comprise any suitable platform including but not limited to unmanned vehicles, manned vehicles, aquatic vehicles, amphibious vehicles, aeronautic vehicles any other suitable vehicle, and/ or a combination, or the like. In the off-road chassis implementation, steering can be achieved by a method which is known as "differential drive" to those skilled in the art. The entirety of the internal electronics and drive train is protected from the environment.

Key in the invention is the use of a managed power system to improve robustness and usability. As well as applying known methods to estimate power usage and battery capacity, the managed power system can be enabled to allow users to perform a tool less "hot-swap" of batteries if desired, allowing system runtime to be extended indefinitely with only intermittent interruptions to operation by battery changes and no interruptions to sensor or computational power.

The system also separates key hardware such as communications devices, power amplifiers, user interface hardware, and control processors into discrete modules linked via a central vehicle control network. An example implementation of this control network uses the well-known CAN (Controller Area Network) standard, which is commonly used in the automotive and aerospace sector. Each module can communicate with any other module on the network, and the network is structured such that the highest priority messages always make it to their recipients without requiring retransmission.

These discrete modules can be upgraded in the field without requiring manufacturer service. Additionally, since they exchange information in a common, well-defined manner, users do not have to modify any of the modules in a system when upgrading An aspect of the specification provides a distributed hardware system for controlling a vehicle, comprising: a network; a central control module for controlling the distributed hardware system; a plurality of electronic hardware modules in communication with the central control module via the network, each of the plurality of electronic hardware modules enabled to: communicate with one another via the network; issue requests for information from the central control module via network; transmit data over the network in a common format to perform tasks respective to a respective function; and at least one of: independently sense one or more of: a respective status of the distributed hardware system and at least one respective environmental parameter; and independently control the respective function of the vehicle, and at least a portion of the plurality of electronic hardware modules enabled to: be removed and inserted from the distributed hardware system as plug and play modules; and determine when at least one of the plurality of electronic hardware modules is removed or inserted from the distributed hardware system and transition to a corresponding state.

The distributed hardware system can further comprise at least one power source. The at least one power source can comprise at least two batteries and respective battery bins enabled to independently open such that a hot swap of a respective battery can be performed.

The control module can be enabled to control power to each of the plurality of electronic hardware modules. The distributed hardware system can further comprise at least a first power source powering the distributed hardware system and a second power source, wherein one or more of the control module and at least one of the plurality of electronic hardware modules can be further enabled to: determine that the first power source is no longer able to power the distributed hardware system; and implement a power down transition in the distributed hardware system such that powering of the distributed hardware system is switched to the second power source and a hot swap sequence can be implemented to remove the first power source and insert a third power source. The power down transition can comprise a motor power down transition. The one or more of the control module and at least one of the plurality of electronic hardware modules can be further enabled to enter a low power state until the hot swap sequence occurs.

The distributed hardware system can further comprise at least one sensor for sensing at least one of the respective status of the distributed hardware system and the at least one respective environmental parameter, wherein a respective one of the plurality of electronic hardware modules can be enabled for communication with the at least one sensor.

At least one of the plurality of electronic hardware modules can comprise a motor amplifier module for controlling a motor of the vehicle.

At least one of the plurality of electronic hardware modules can comprise a radio frequency (RF) module enabled to receive command data from a remote control system, translate the command data to the common format and communicate translated command data over the network.

At least one of the plurality of electronic hardware modules can comprise a remote control receiver enabled to receive command data from an off-the-shelf remote control receiver, translate the command data to the common format and communicate translated commands over the network.

At least one of the plurality of electronic hardware modules can comprise a user interface module enabled to at least one of receive command data from an input device and convey system data to a user.

The network can comprise at least one of a vehicle control network and a communication bus.

The distributed hardware system can further comprise at least one of a battery charging system and at least one motor.

The central control module can be enabled to communicate with a high level computing system via a control link.

The central control module can be enabled to store at least one of: system state information received from the plurality of electronic hardware modules; setting data; setpoint data; and a combination thereof.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 is a depiction of a possible hot-swap capable battery receptacle

DETAILED DESCRIPTION

Figure 1:
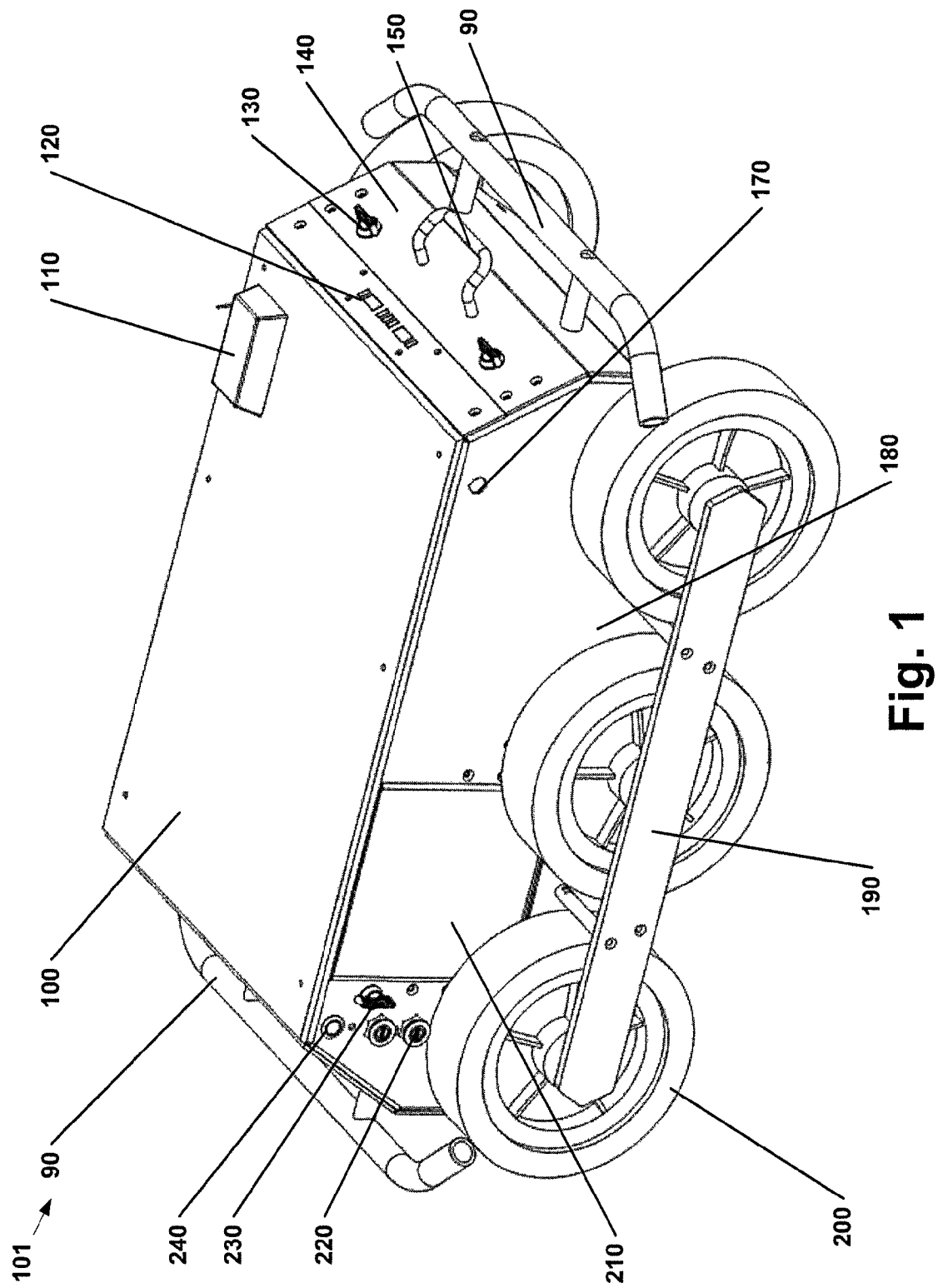
FIG. 1 depicts external characteristics features of an unmanned vehicle platform, according to non-limiting implementations.

FIG. 1 depicts external features of an unmanned vehicle platform 101, according to non-limiting implementations. A chassis 180 and supporting external members 190 house or otherwise provide stable mounting points for sensors, computing systems, and other devices. Unmanned vehicle platform 101 is enabled to track trajectories by way of actuating a set of wheels 200, which in non-limiting depicted implementations are arranged in a differential-drive configuration. Devices may be mounted within the chassis 180 or external to it, on removable and modular plates 100 or affixed to bumpers 90.

For ease of access to devices mounted within the chassis, drawers 140 are securable from opening using, for example, a set of latches 130, and may be opened via handles 150, springs, or the like. Bumpers 90 may be designed to provide an ergonomic carrying method for the combination of the platform and any other attached devices. Batteries are accessible externally via the battery bays 210 which may incorporate a battery bay latch 230. In some implementations, if users do not wish to remove batteries for charging, they may be charged while still in the platform via charge connectors 220.

Unmanned vehicle platform 101 can comprise a set of controls mounted directly to the chassis. In depicted example implementations, unmanned vehicle platform 101 is enabled for activation/deactivation via a latching pushbutton 240 and can be emergency stopped manually via a safety pushbutton 170. Any other suitable method of controlling unmanned vehicle platform 101 is within the scope of present implementations, including but not limited to issuing commands from a computing system mounted within the drawers 140 and/or by sending commands to a remote control receiver module 110. A degree of feedback on the state of the system of the unmanned vehicle platform 101 can be provided via a status display 120.

Figure 2A:
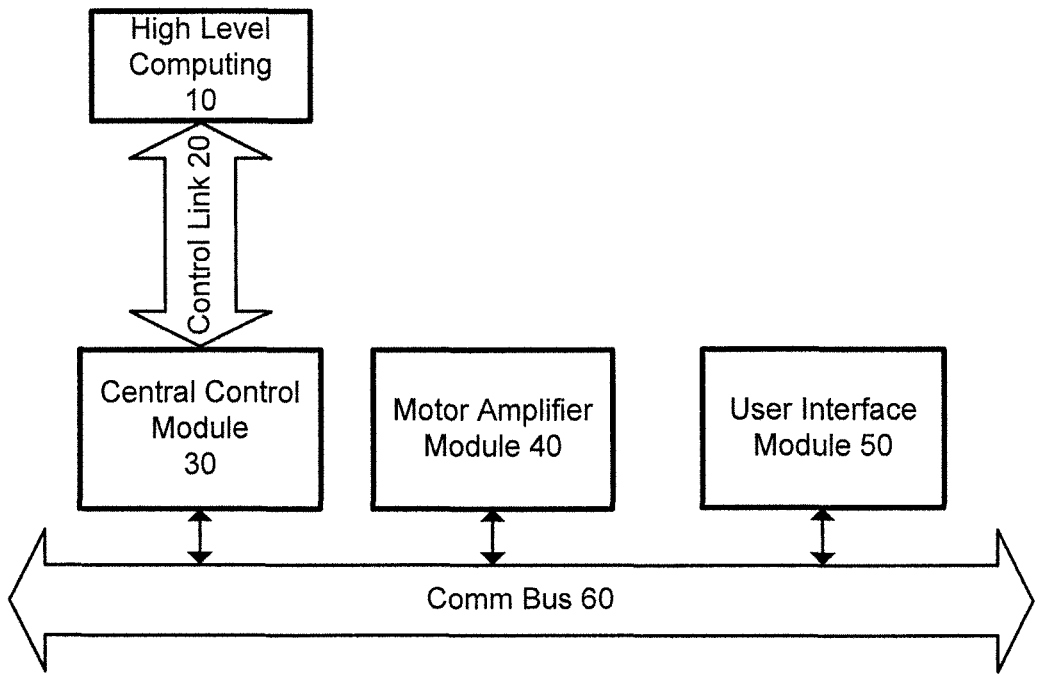
FIGS. 2a and 2b depict two possible arrangements of internal modules of the unmanned vehicle platform of FIG. 1, according to non-limiting implementations.
Figure 2B:
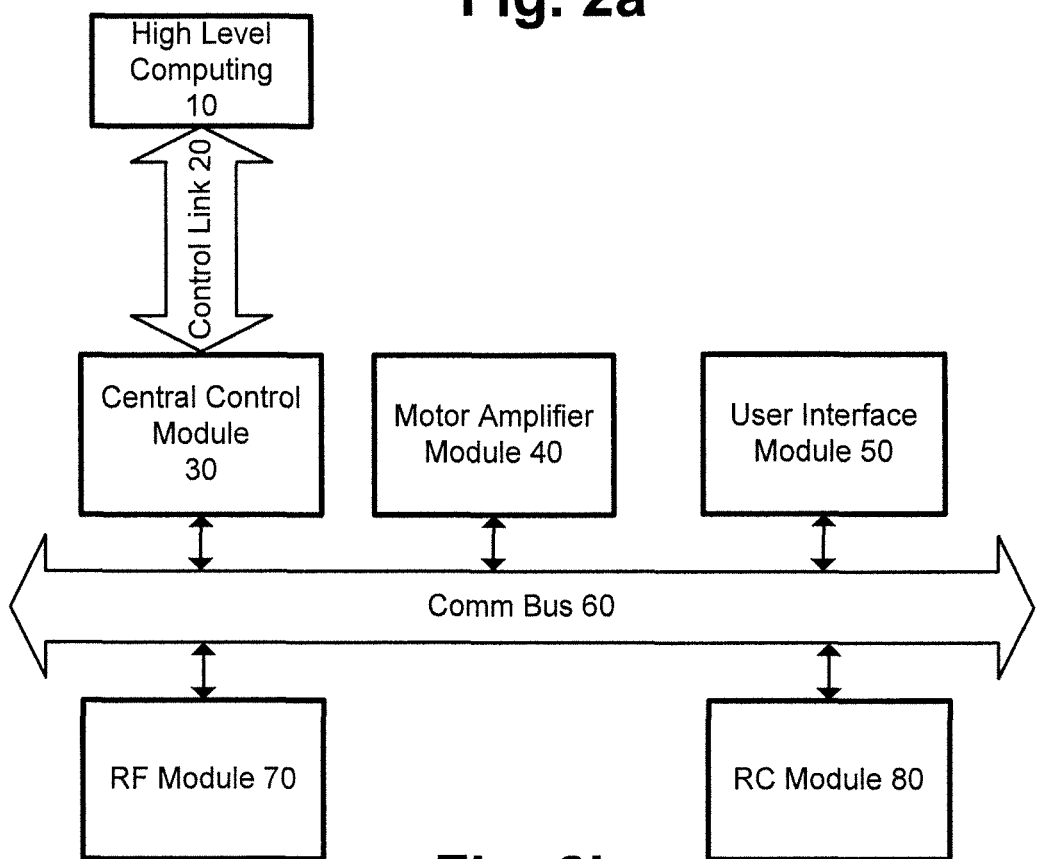

Internally, unmanned vehicle platform 101 can comprise a plurality of possible operational modules, each of which may provide unmanned vehicle platform 101 with a different set of capabilities. FIGS. 2a and 2b shows two possible arrangements of internal modules. FIG. 2a depicts a central control module 30 connected to a motor amplifier module 40 and a user interface module 50 by way of a vehicle control network 60. Vehicle control network 60 can comprise any suitable network hardware and topology, including but not limited to a communication bus (e.g. as depicted), the "CANBus" standard (which can used for its speed and robustness to noise), or the like. Any other suitable network hardware and topology is within the scope of present implementations, including any suitable network hardware and topology commonly in use.

Modules 30, 40, 50 can also be enabled to receive commands from other systems not on the vehicle control network 60. For example, in non-limiting exemplary implementations, the central control module 30 can be connected via a control link 20 to a high-level computing system 10, over which it reports status, sends sensor data, and receives commands. The embodiment as shown uses a wired serial point-to-point connection as the control link 20 and an off-the-shelf laptop computer as the high-level computing system 10, but the system is not restricted to these choices. For example, the control link 20 could be a radio modem and the high-level computing system 10 could be a rack-mounted server. It is appreciated that any suitable control link and/or computing system is within the scope of present implementations.

FIG. 2b is similar to FIG. 2a, with like elements having like numbers, however the arrangement of modules of FIG. 2b further comprises an RF (radio frequency) module 70 enabled to receive wireless emergency stop commands and an RC (radio control/radio receiver) module 80 enabled to transform signals from (for example) off-the-shelf radio control receivers to forms which are compatible with the vehicle control network 60. Expanding the platform capabilities in this way does not necessitate any changes to the rest of unmanned vehicle platform 101.

Attention is now directed to FIGS. 3a, 3b and 3c depicts a toolless battery change process/sequence, according to non-limiting implementations; FIG. 3a depicts a battery bin 260 in a closed position, FIG. 3b depicts the battery bin 260 in an open position, and FIG. 3c depicts the battery bin 260 in the open position with a battery 320 external to the battery bin 260. With reference to FIG. 3a, the battery bin 260 is secured to the chassis 180 via pivots 290. The battery bin 260 incorporates integrated terminals 270 which elastically deform under the weight of the battery to maintain electrical connectivity. Also mounted to the battery bin 260 are two mechanical stops 250, 280 which constrain the pivoting of the battery bin 260 by contacting the chassis 180. A battery bay latch 230 may be used to lock the battery bin 260 in the closed position by engaging with a latch slot 300. Additionally, this battery bay latch 230 may include a sensor on it to allow the central control module 30 to determine when the battery bay 260 is opened or closed. If this is the case, the battery bay latch 230 is designed such that it cannot be closed when the battery bay 260 is open. Finally, a spring assembly 310 may add to the force keeping the battery terminals 330 mated with the integrated terminals 270 when the battery bin 260 is closed.

The battery 320 is removed by releasing the battery bay latch 230 and manually pivoting the battery bin 260 until the opening mechanical stop 250 makes contact with the chassis 180, as in FIG. 3b. When the battery bay latch 230 includes a sensor capable of monitoring its state, the central control module 30 can execute appropriate instructions to handle the opening event (for example, as described below with reference to FIG. 7). The battery bin 260 may also be opened by a spring assembly or by other automated means. The battery 320 is then removed, as in FIG. 3c. The removal process itself can be dependent on the battery form factor. In exemplary implementations, the removal process can take the form of a manually actuated pull strap.

The battery 320 is replaced by reversing the process. The battery 320 is slid into the battery bin 260 until the battery terminals 330 mate with the integrated terminals 270. The battery bin 260 is then pivoted closed until the closing mechanical stop 280 makes contact with the chassis 180. Finally, the battery bin 260 is secured with the battery bay latch 230. If the battery bay latch 230 includes a sensor capable of monitoring its state, the central control module 30 can now execute appropriate instructions to handle the closing event.

Figure 4:
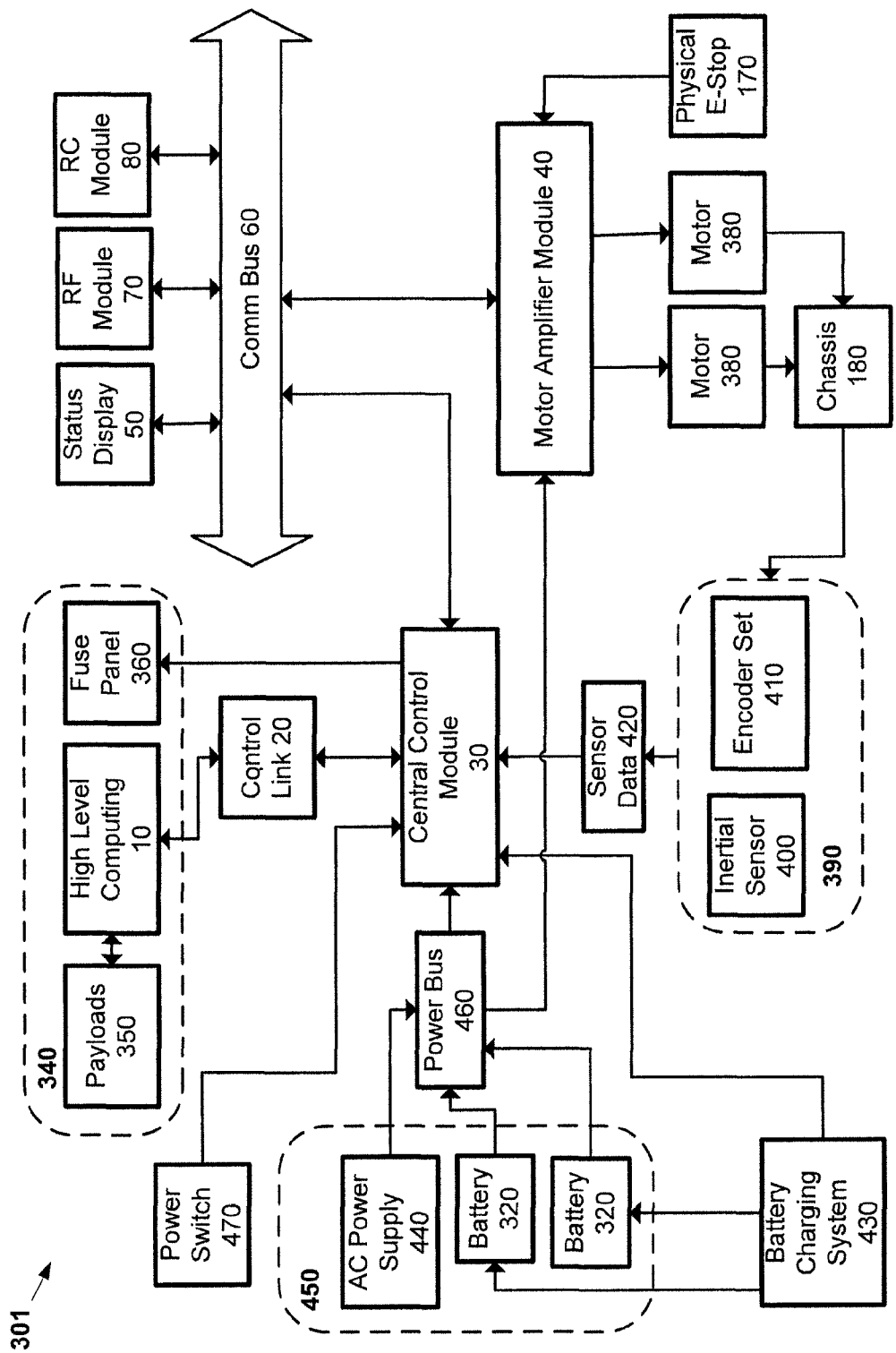
FIG. 4 depicts configuration of electronic modules and device network of the unmanned vehicle platform of FIG. 1, according to non-limiting implementations

FIG. 4 depicts a system 301 of electronic modules and device network of unmanned vehicle platform 101, according to non-limiting implementations. The central control module 30 is powered by a power bus 460 which itself is fed from a plurality of power sources which may include one or more batteries 320 and/or an AC power supply 440 or the like. Batteries 320 used in unmanned vehicle platform 101 can be recharged without being removed by the battery charging system 430. The battery charging system 430 can indicate to the central control module 30 when the batteries 320 are being charged.

The central control module 30 can be enabled to shut off or turn on any subset of the available power sources, while the platform's power switch 470 shuts off all available power sources. The central control module 30 is further enabled to power the fuse panel 360, any internal modules 50, 70, 80, low-level sensors 390 and portions of the motor amplifier module 40. Incorporated into the low-level sensors 390 are a number of control feedback sensors which can be used to perform platform state estimation. Control feedback sensors can include but are not limited to inertial sensors 400 and encoders 410, where the encoders 410 can use any suitable sensing methods (e.g. optical, magnetic, mechanical or the like). In the latter case, the encoders 410 can be physically connected to the drive train of the chassis 180, providing a direct observation of various speeds within the drive train. These feedback sensors 400 and encoders 410 may be used to improve the trajectory tracking performance of the unmanned vehicle platform 101 and/or may be restricted to observing changes in a state of the unmanned vehicle platform 101.

The payload bay 340 is generally comprised of components that a user interacts with during operation of the unmanned vehicle platform 101. In depicted implementations, the payload bay 340 contains the high-level computing system 10, the fuse panel 360 and a plurality of payloads 350.

Payloads 350 can comprise additional sensors, additional actuators, communications devices, additional computing hardware, and any other suitable equipment, including equipment that can commonly be found on other unmanned vehicle platforms.

The high-level computing system 10 is connected using appropriate interfaces to the payloads 350. The fuse panel 360 routes power from the central control module 30 to the high-level computing system 10 and the payloads 350, and may have multiple fused connectors for a variety of different voltage levels and current ratings. Any suitable software can be deployed to the high-level computing system 10.

The central control module 30 communicates via the vehicle control network 60 with secondary modules 40, 50, 70, 80 as appropriate. Communications may happen sporadically or at a regular frequency. When the latter, one or more modules can be enabled to require a given message frequency to remain operational, which can improve the safety of the unmanned vehicle platform 101. For example, such an implementation can be useful when receiving commands via the remote receiver module 80, monitoring remote switches via the RF module 50 and/or commanding motor motion via the motor amplifier module 40. However, such a requirement on message frequency can be less useful with other modules such as the user interface module 70. Furthermore, it is appreciated that use of the phrases "require" and "requirement" refer only to particular implementations and the given message frequency remaining operational is to be construed as being required in all implementations and/or to be unduly limiting.

Figure 5:
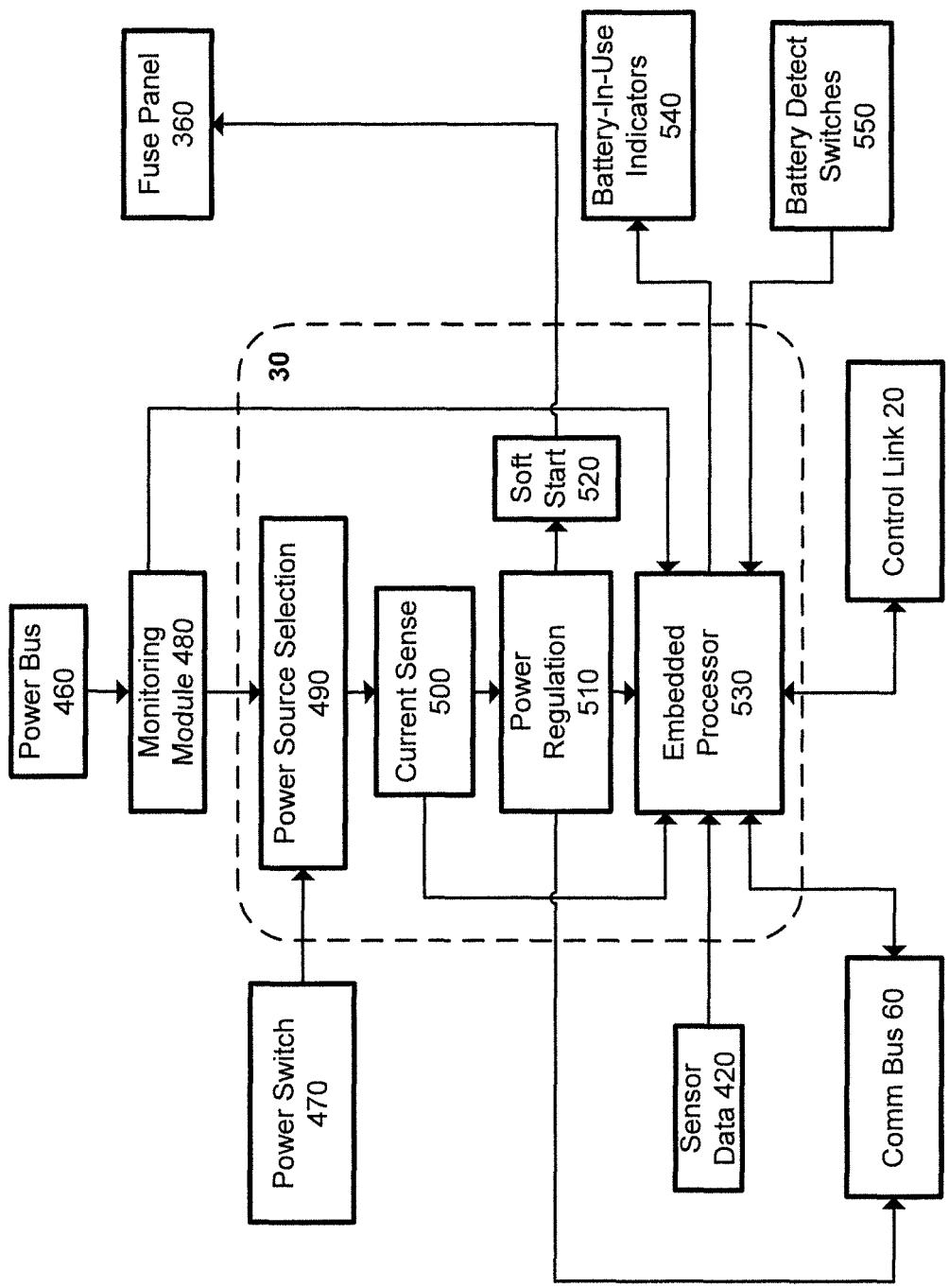
FIG. 5 depicts a configuration of a central control module of the unmanned vehicle platform of FIG. 1, according to non-limiting implementations.

FIG. 5 depicts a configuration of a central control module 30 of the unmanned vehicle platform 101, according to non-limiting implementations. The main components of the central control module comprise a power source selection module 490, a power regulation module 510 and an embedded processor 530. The power source selection module 490 is enabled to select which of the available power sources within the power bus 460 is fed into the power regulation module 510. This selection is done based on the information made available by the monitoring module 480. The power regulation module 510 powers the embedded processor 530, the fuse panel 360 (including devices powered by the fuse panel), and any other devices which are connected to the vehicle control network 60.

As well, the battery detect switches 550 enable the power source selection module 490 to determine if the user is removing a battery 320 or if they have recently replaced one. With such information, the power source selection module 490 can minimize system downtime by ensuring that the unmanned vehicle platform 101 and/or the system 301 is powered from a reliable power source at all times. Optional display indicators, such as the status panel 120 and/or the battery-in-use indicators 540 can indicate which subset of power sources are being used at any given time.

A soft start module 520 may be used to limit the inrush current into the fuse panel 360 and other devices powered by the power regulation module 510. The status of each power source in the power bus 460 is monitored using corresponding monitoring modules 480. The monitoring modules 480 may retrieve any subset of temperature, voltage and current draw data or the like. The monitoring module 480 may also use this data to estimate the health of each power source in the power bus 460. This data can also report to the embedded processor 530 so that it can reduce power draw when necessary. The data may also be forwarded to the high level computing system 10 or retransmitted along the vehicle control network 60.

Each monitoring module 480 can be enabled to shut off power from its associated power source. There may also be a separate current sense module 500 that reports current draw data to the embedded processor 530. A power switch 470 is used to shut off all available power sources. The embedded processor 530 also collects sensor data 520 from a plurality of sensors, which may include, but is not limited to, devices such as a tilt-compensated compass, IR rangefinders, angular rate gyros, and wheel encoders.

Figure 6:
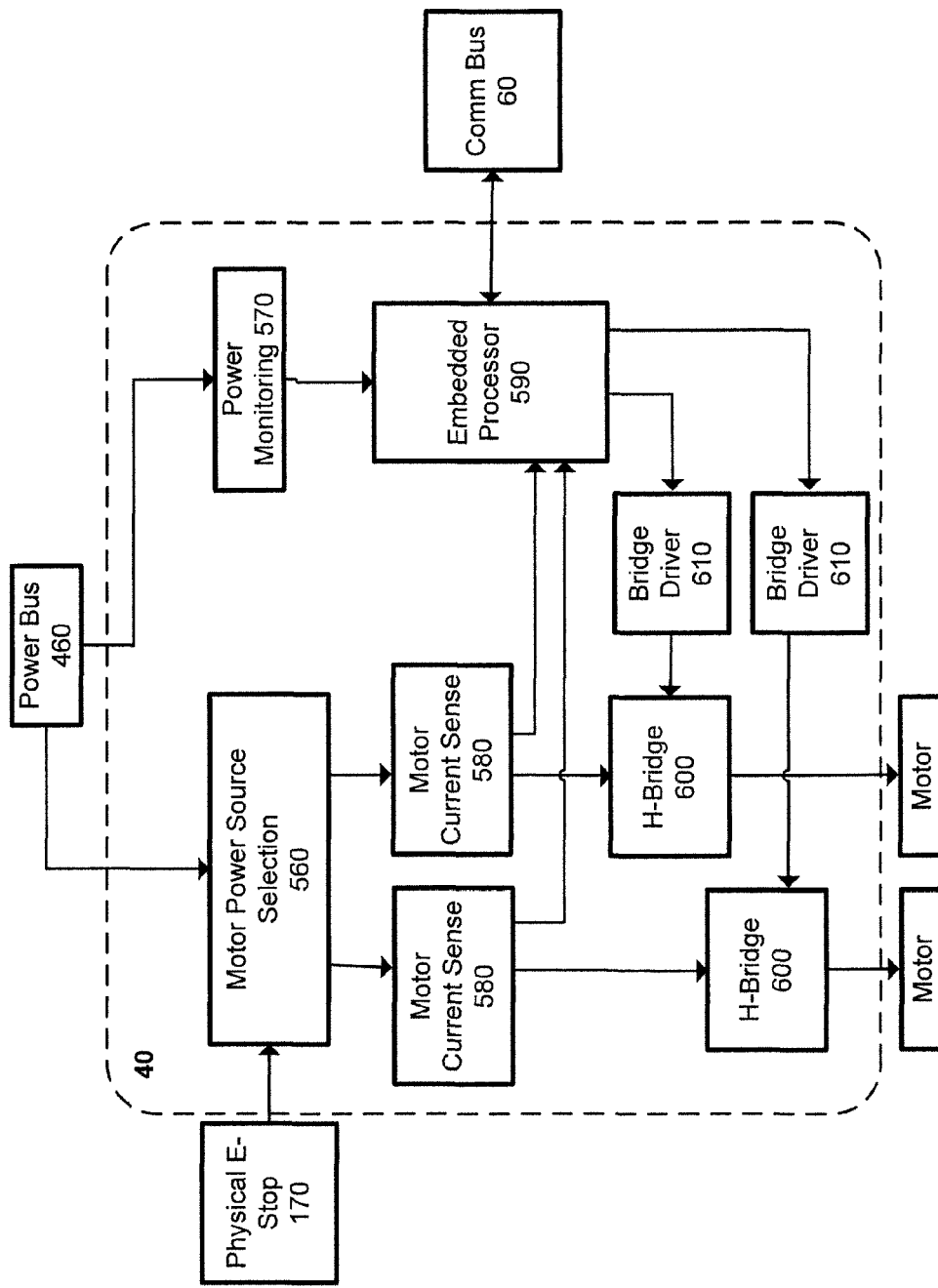
FIG. 6 depicts a configuration of a motor amplifier module of the unmanned vehicle platform, according to non-limiting implementations.

FIG. 6 depicts a configuration of a motor amplifier module 40 of the unmanned vehicle platform 101, according to non-limiting implementations. The motor amplifier module 40 comprises an embedded processor 590, a motor power source selection module 560 and any suitable ancillary components, for example any suitable ancillary components that can be determined according to electrical design principles. The embedded processor 590 can communicate with the central control module 30 and other modules in the system 301 using the vehicle control network 60. The power regulation module 510 located in the central control module 30 provides the power necessary to run the embedded processor 590. This power is transmitted along the same path as the vehicle control network 60. The embedded processor 590 can read battery voltages using the power monitoring system 570 and motor current draw using the current sense modules 580.

These measurements can be used for platform health monitoring, or can be incorporated further into the platform control system 301 to allow for more precise control strategies. The motors 380 are powered by sources selected by the motor power source selection module 560. Power to each motor 380 is controlled by the embedded processor 590. The embedded processor 590 can use any suitable strategy to regulate the power to each motor 380. In exemplary implementations, as depicted, each motor 380 is driven by an H-bridge circuit 600 which is controlled by a bridge driver 610. Each bridge driver 610 is in turn controlled by the embedded processor 590.

A physical E-stop 170 can be used to cut off power to parts of the system 301, if necessary, providing a robust safety system which is not dependent at all on firmware. For example the physical E-stop 170 can be monitored by the motor power selection module 560. When the physical E-stop 170 is activated, the motor power selection module 560 can shut off all power to the H-bridge circuits 600 and by extension halts the motors 380.

Figure 7:
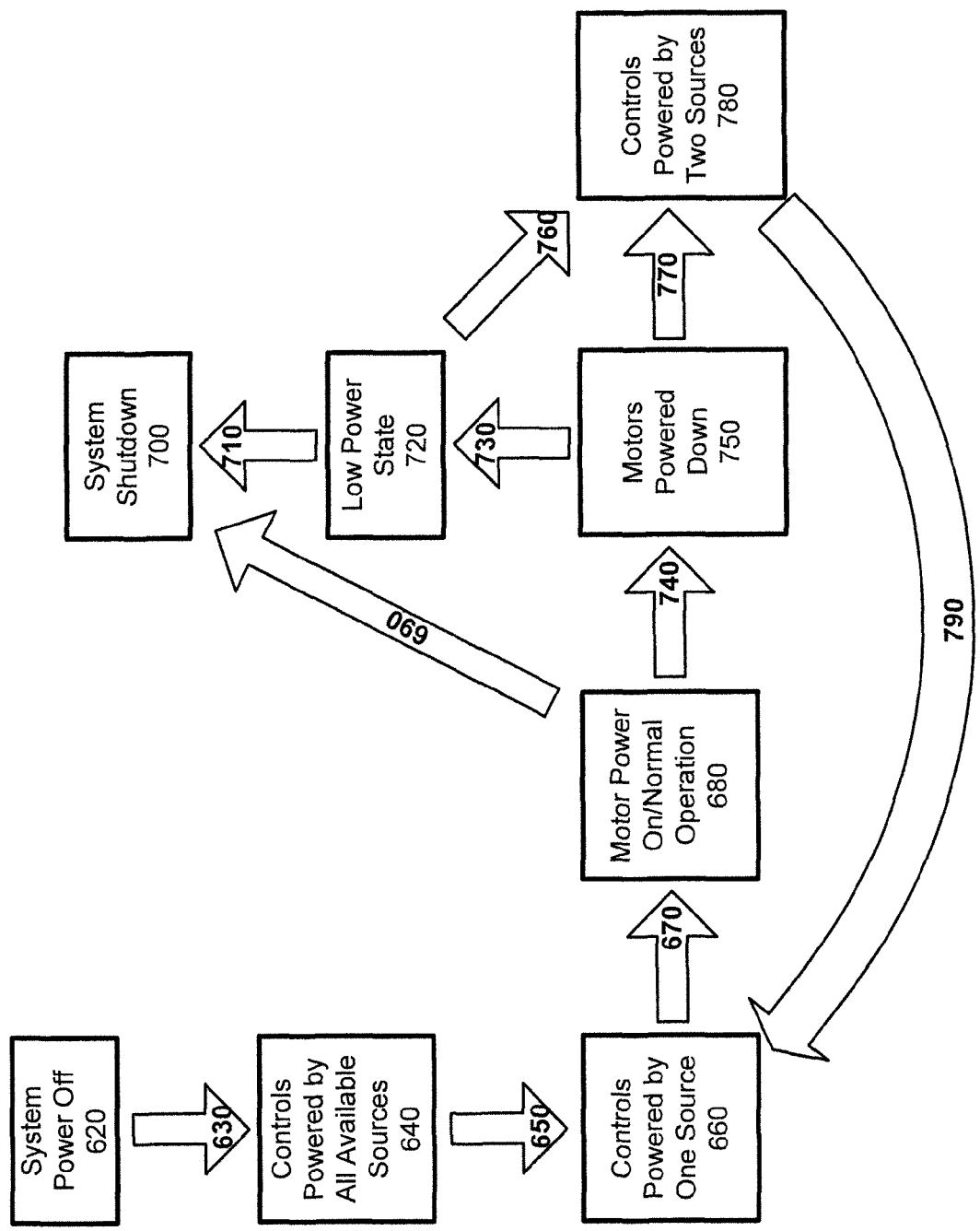
FIG. 7 depicts a process flow for a power management system that can be implemented by the unmanned vehicle platform of FIG. 1, according to non-limiting implementations.

FIG. 7 depicts a process flow for a managing a power bus 460 that can be implemented by the unmanned vehicle platform 101, according to non-limiting implementations. The unmanned vehicle platform 101 starts in a power off state 620. When the main power switch 470 is turned on, a power-on transition occurs 630 and the central control module 30, as well as every other device powered by the power regulation module 510, is powered on. For a period of time, the electronics are powered by all available power sources 640. After a period of time, the embedded processor 530 instructs the power source selection module 490 to choose a single power source and a power source selection transition 650 occurs.

In the single-power state 660, the central control module 30, and every other device powered by the power regulation module 510, is powered by a single power source (e.g. a first battery of batteries 320). In some configurations the system 301 will remain powered by a secondary power source, such as a second battery of batteries 320, in addition to a source such as an AC power supply 440 in case the primary source is suddenly removed. After the power source selection transition 650 occurs, the motor power source selection module 560 turns on the power source to power the motors and a motor power transition 670 occurs. Once the motor power transition 670 has been completed, the unmanned vehicle platform 101 has entered its normal operation state 680.

A number of situations can cause the unmanned vehicle platform 101 to leave the normal operation state 680. Such situations may include the triggering of the battery detect switch 550, the battery state-of-charge dropping below a preset threshold, or the user swapping out a current power source/battery 320. If one of these situations occurs, the unmanned vehicle platform 101 leaves the normal operation state 680 and a motor power down transition 740 occurs. During the motor power down transition 740, the motor power source selection module 560 shuts down all power to the motors 380 and the system 301 then transitions into the motors powered down state 750. If the motor power down transition 740 occurred due to a low state-of-charge on the batteries 320 then the vehicle will undergo a state transition 730 to a low-power state 720.

In the low power state, the unmanned vehicle platform 101 waits until the charge on the battery 320 reaches a critically low level and another transition 710 occurs to a shut down state 700. The user may add a fresh battery 320 or an additional power source such as an AC power supply 440 to prevent the system 301 from entering the shut down state 700. In this case, the system 301 switches the new power source on, undergoes a recovery transition 760, and is powered by both the old and the new power source for a period of time 790. From this state, the system 301 would return to being powered by one source 660 by shutting the old source off and will eventually return to normal operation 680 as it did when first starting up.

In the situation where the unmanned vehicle platform 101 undergoes a motor power down transition 740 because the battery detect switch 550 had been triggered or the user is swapping out the current power source, a secondary power source transition 770 occurs and the unmanned vehicle platform 101 is powered by two power sources for a period of time 790. From this state 790, the unmanned vehicle platform 101 would shut off the old power source and return to being powered by one source 660. The unmanned vehicle platform 101 would then return to the normal operation state 680 as it did when first starting. If the user removes the only available power source, a shutdown transition 690 occurs and the unmanned vehicle platform 101 enters the shut down state 700 immediately.

Figure 8:
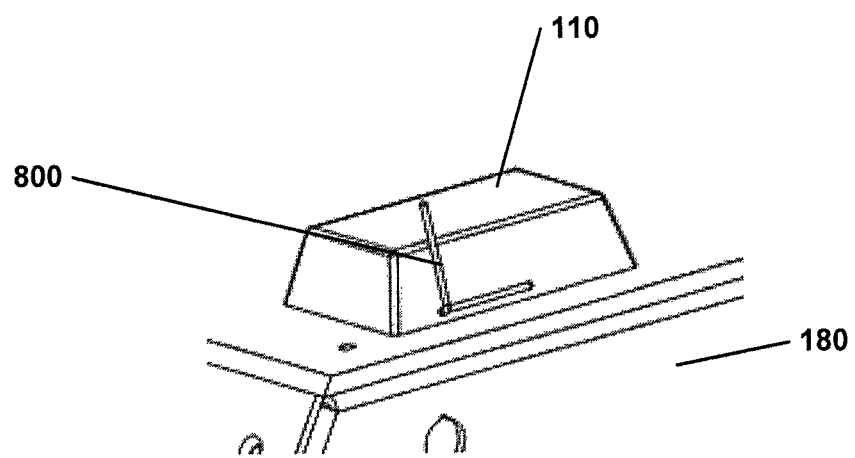
FIG. 8 depicts a remote receiver module mounted to chassis 180 of the unmanned vehicle platform of FIG. 1, according to non-limiting implementations.

FIG. 8 depicts detail of a remote receiver module 110 mounted to the chassis 180, according to non-limiting implementations. The remote receiver module 110 can comprise any suitable remote receivers, including but not limited to remote receivers enabled to improve performance, for example by altering an enclosure composition, adding external antennas 800 or the like.

Figure 9:
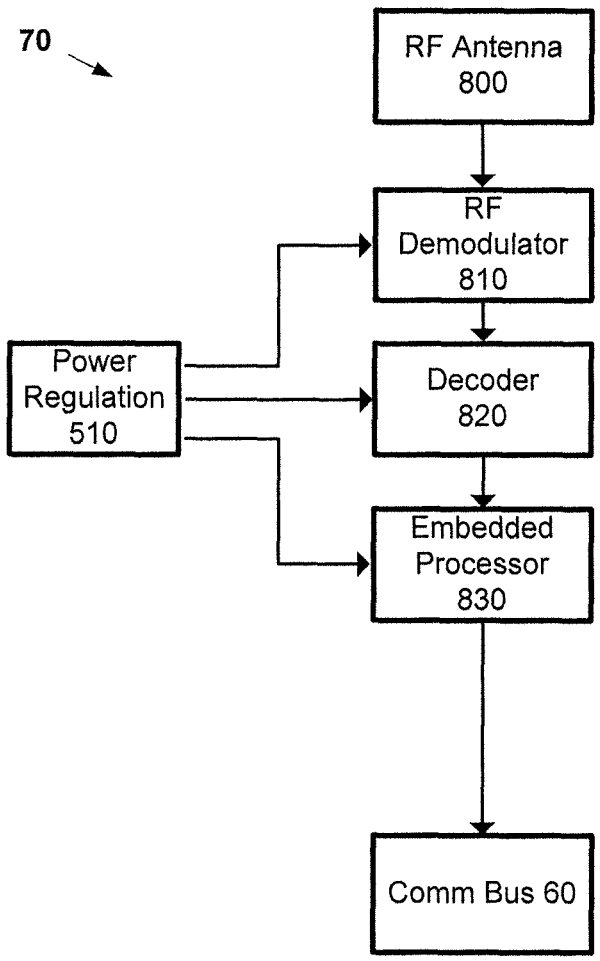
FIG. 9 depicts a configuration of an RF module of the unmanned vehicle platform of FIG. 1, according to non-limiting implementations.

FIG. 9 depicts a configuration of the RF module 70 of the unmanned vehicle platform 101, according to non-limiting implementations, which enables direct wireless control of the central control module 30. The RF module 70 comprises an RF antenna 800 that provides a modulated signal to the RF demodulator 810. The RF demodulator 810 sends out a string of data, as received by the antenna 800, to the decoder 820. The decoder 820 reads a serial bit stream and translates the data to a parallel bus. The parallel bus is read in by the embedded processor 830. The embedded processor 830 then encodes the data and communicates the encoded data over the vehicle control network 60. The entirety of this module is powered by the power regulation module 510. This configuration is only an example and the specifics of details such as modulation, frequency, and power are not to be construed as being particularly limiting.

Figure 10:
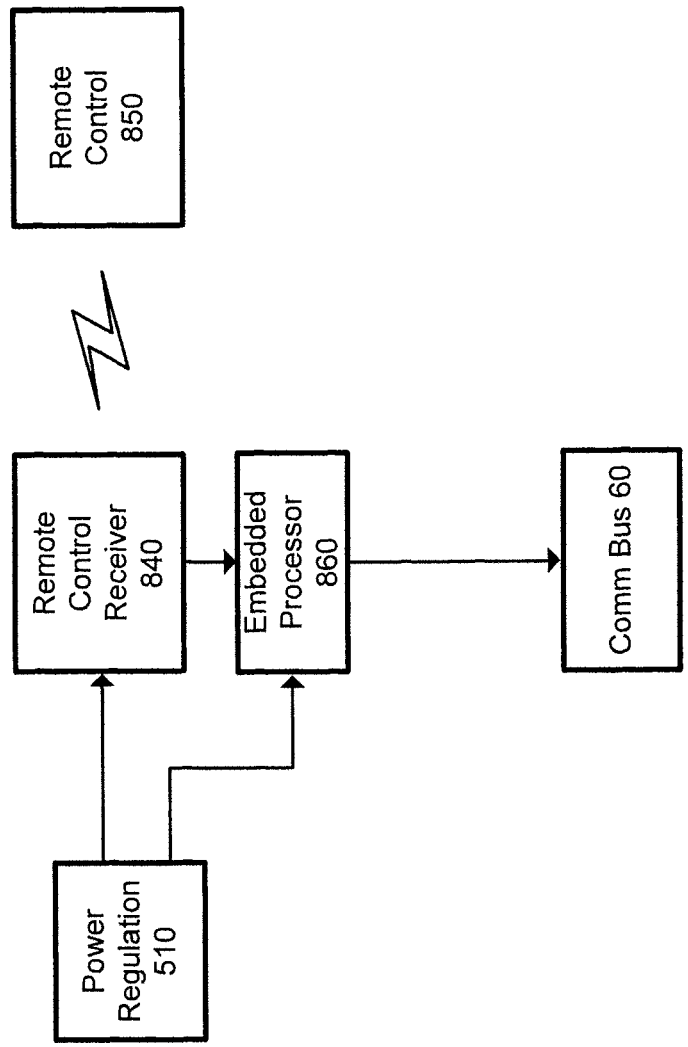
FIG. 10 depicts a configuration of a remote receiver module of the unmanned vehicle platform of FIG. 1, according to non-limiting implementations.

FIG. 10 depicts a configuration of the remote receiver module 80 of the unmanned vehicle platform 101, according to non-limiting implementations. Remote receiver module 80 is enabled to translate data from, for example, off-the-shelf remote receivers to a common format, which enables many off-the-shelf remote receivers to be integrated with the unmanned vehicle platform 101 without changing the firmware or electrical system of the central control module 30. Such data can be transmitted over a 2.4 GHz band, or any other suitable radio band, or the like. The remote receiver module 80 can comprise (for example) an off-the-shelf remote control receiver 840 and an embedded processor 860. The remote control receiver 840 and the embedded processor 860 are powered by the power regulation module 510. The remote control receiver 840 demodulates transmissions sent by the remote control transmitter 850. The remote control transmitter 850 can be handheld, stationary, or in any other physical configuration.

The remote control receiver 840 forwards the demodulated transmission to the embedded processor 860. The demodulated transmission can consist of servo pulses, pulse width modulation signals, a serial bit stream, or any other number of transmission formats as known to those skilled in the art, or the like. The embedded processor 860 interprets the demodulated transmission and reformats the received data into a form which can be transmitted on the vehicle control network 60. The embedded processor 860 can also be enabled to conduct some filtering on the demodulated transmission. Such filtering can comprise detecting when the remote control transmitter 850 is out of range of the remote control receiver 840. Similarly, such filtering could also serve to reject invalid transmissions and reduce noise.

Figure 11:
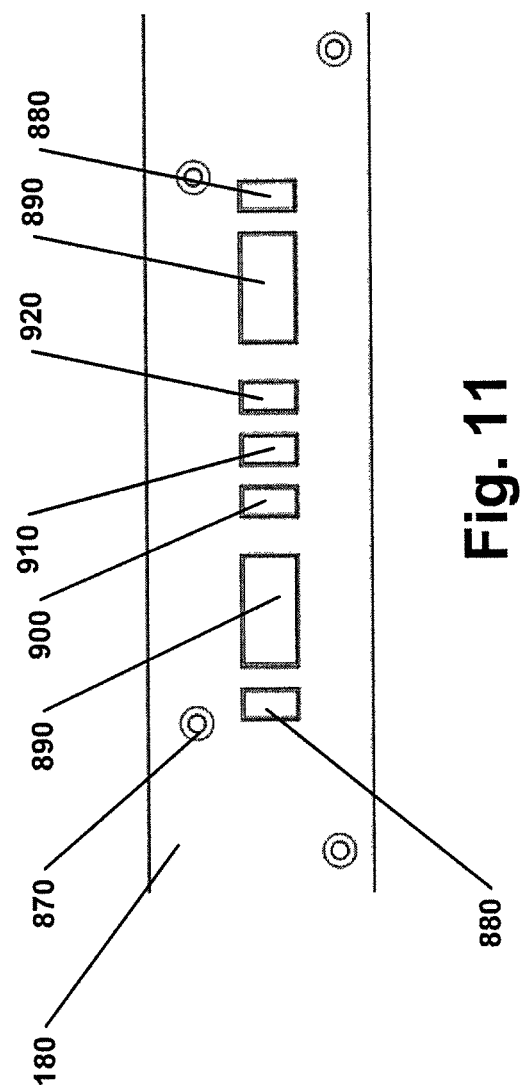
FIG. 11 depicts a status display of the unmanned vehicle platform of FIG. 1, according to non-limiting implementations.

FIG. 11 depicts a status display 120 of the unmanned vehicle platform 101, according to non-limiting implementations, mounted on an exemplary chassis 180 by mechanical hardware 870. The status display 120 can be positioned in any suitable manner, for example such that it is visible to users from the exterior of the chassis 180. In exemplary depicted non-limiting implementations, indicator lights 880-920 are mounted to a single printed circuit board. Furthermore, the user interface module 50 can comprise the status display 120. Exemplary functions of the indicator lights 880-920 include, but are not limited to: indicating the presence of main electronics power 900, indication of communications failure 910, indication of use of power source selection 880, depiction of the state of charge of an onboard power source 890, depiction of overall system status 920 or the like.

The user interface module 50 can also be enabled receive inputs, and the portion of the chassis 180 to which the status display 120 is mounted can be enabled for quick replacement to match different physical layouts of the status display 120 can optionally incorporate input devices such as mode switches or adjustment knobs or the like.

Figure 12:
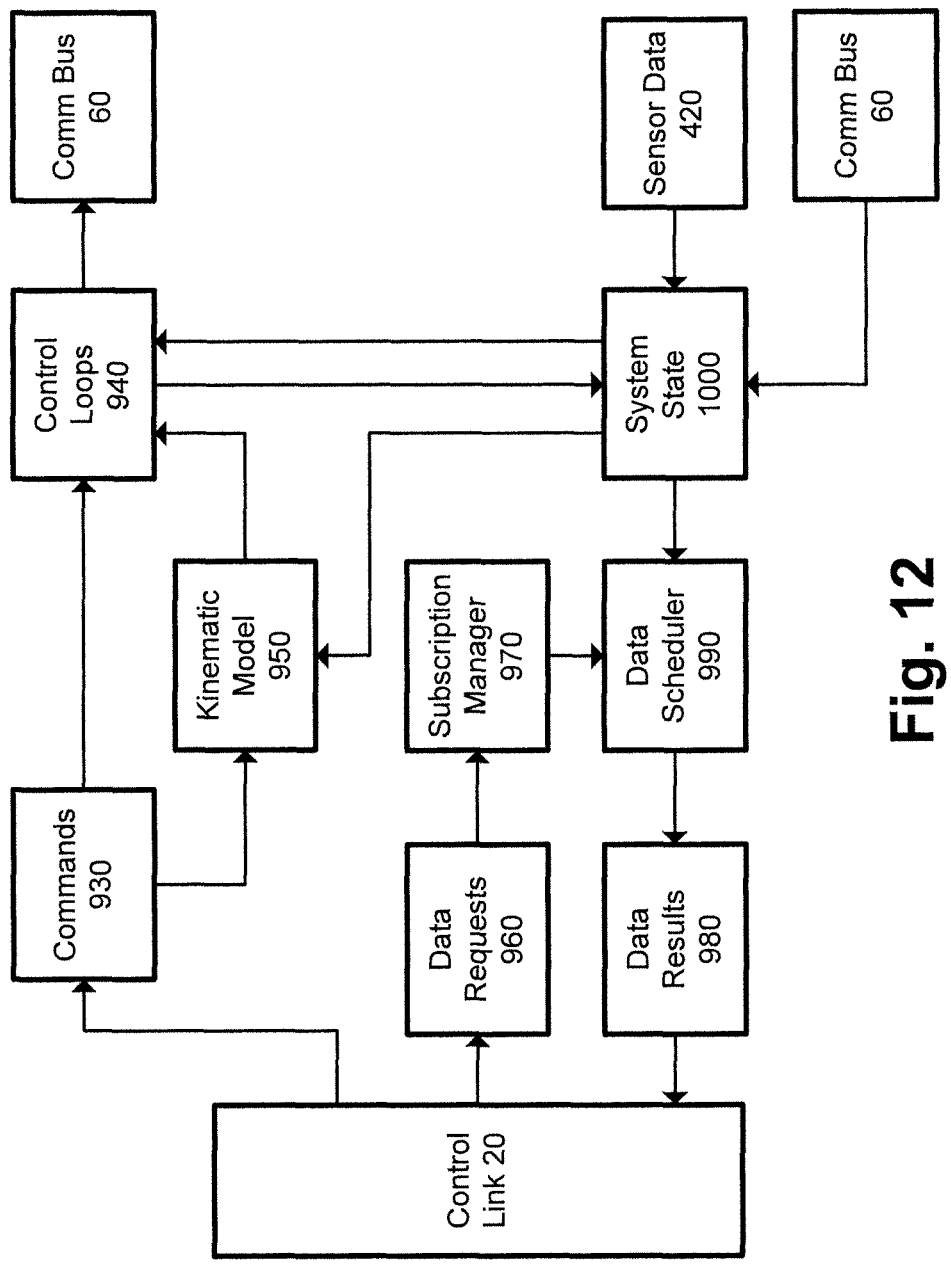
FIG. 12 depicts an example program layout of vehicle control firmware of each module attached to the unmanned vehicle platform of FIG. 1 via a central vehicle control network, according to non-limiting implementations.

FIG. 12 depicts a program layout of vehicle control firmware of the unmanned vehicle platform 101, according to non-limiting implementations. The control link 20 provides full-duplex serial communication to the system 301, including error detection. The system 301 of unmanned vehicle platform 101 can receive messages which make up commands 930 or data requests 960. Commands 930 can affect vehicle settings and setpoints directly or can be pre-processed by additional modules such as built-in vehicle kinematic models 950. Vehicle settings and setpoints can be verified by a set of control loops 940 before being sent to secondary modules via the vehicle control network 60. The control loops 940 may also be capable of providing some degree of autonomy, for example when the sensor data 420 includes appropriate information. Settings and setpoints can be stored in a central system state 1000. System state 1000 also contains data received from other modules located on the vehicle control network 60. Sensor data 420 may be raw data as received from the hardware, or filtered via analog and/or digital means.

The system 301 of the unmanned vehicle platform 101 can be monitored remotely by issuing data requests 960. Data requests 960 can be structured to require immediate responses from the system 301, or can be subscriptions for periodic updates of specific data. The management of the varied requests and subscriptions can be handled by a subscription manager 970. The subscription manager 970 is queried by a data scheduler 990 which uses this subscription information and the system state 1000 to produce data 980 for the control link 20. In this way, data 980 can thus be produced for the device on the other end of the control link 20 without continual requests for such data, thereby lowering the inbound bandwidth requirements.

Figure 13:
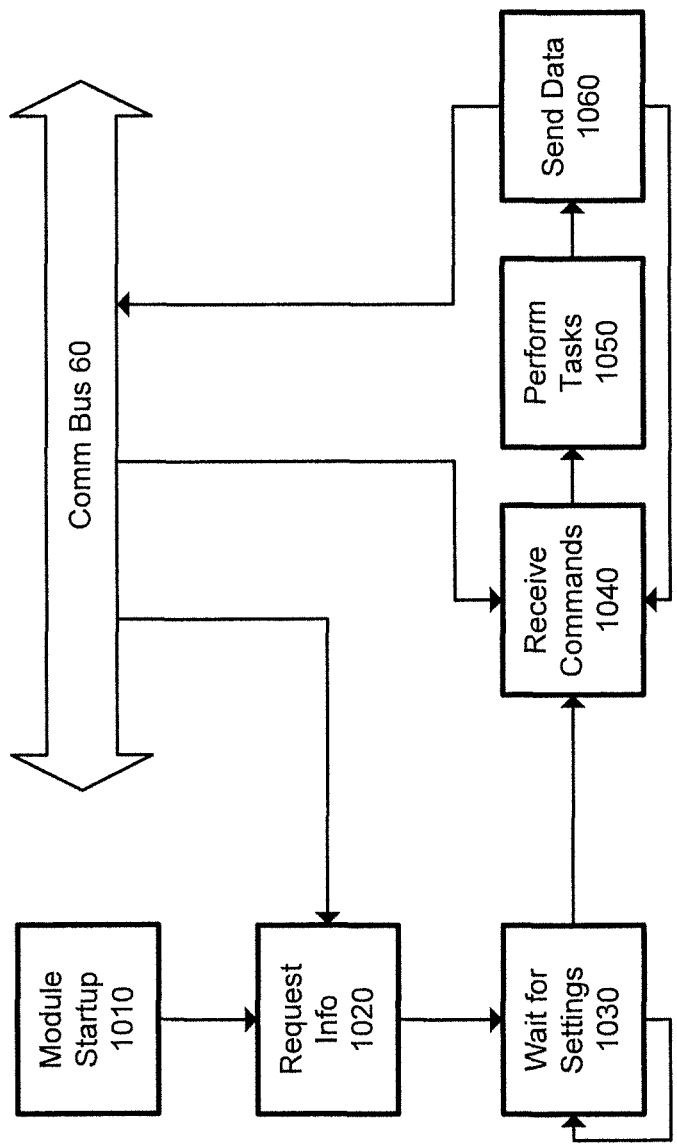
FIG. 13 depicts another example program layout of vehicle control firmware of each module attached to the unmanned vehicle platform of FIG. 1 via a central vehicle control network, according to non-limiting implementations.

FIG. 13 depicts a control flow within each module attached to the vehicle control network 60 of the unmanned vehicle platform 101, according to non-limiting implementations. Upon module start-up 1010, a given module issues requests for information 1020 from the central control module 30 via the vehicle control network 60. For the user interface module 50, this information may be system status, while for the motor amplifier module 40, this information may be safety limits. The given module may then wait for this information to be provided in a loop 1030 or may continue execution.

For non-critical information, the given module may not need to wait, but can continue on and process the information as it arrives. A loop is then entered, wherein the given module receives updated information and commands 1040, performs a variety of tasks 1050, and then transmits information over the vehicle control network 60. Depending on the specifics of the vehicle control network 60, each module may need to specifically address the outgoing data (in the case of a Serial Peripheral Interconnect (SPI), for example), or may be able to send it out as a broadcast, receivable by any module that requires such data (in the case of CAN). The implementation of the loop can be performed in any suitable manner, including but not limited to using a busy-wait structure, hardware timer interrupts, or one of many more complex scheduling strategies used by computer operating systems.

Referring briefly back to FIG. 1, it is appreciated that the unmanned vehicle platform 101 comprises a wheeled land vehicle. However, in other type of vehicles are within the scope of present implementations. For example, while the unmanned vehicle platform 101 is an unmanned platform, systems and modules described herein can be included in unmanned vehicles, manned vehicles, aquatic vehicles, amphibious vehicles, aeronautic vehicles any other suitable vehicle, and/or a combination, or the like.

Figure 14:
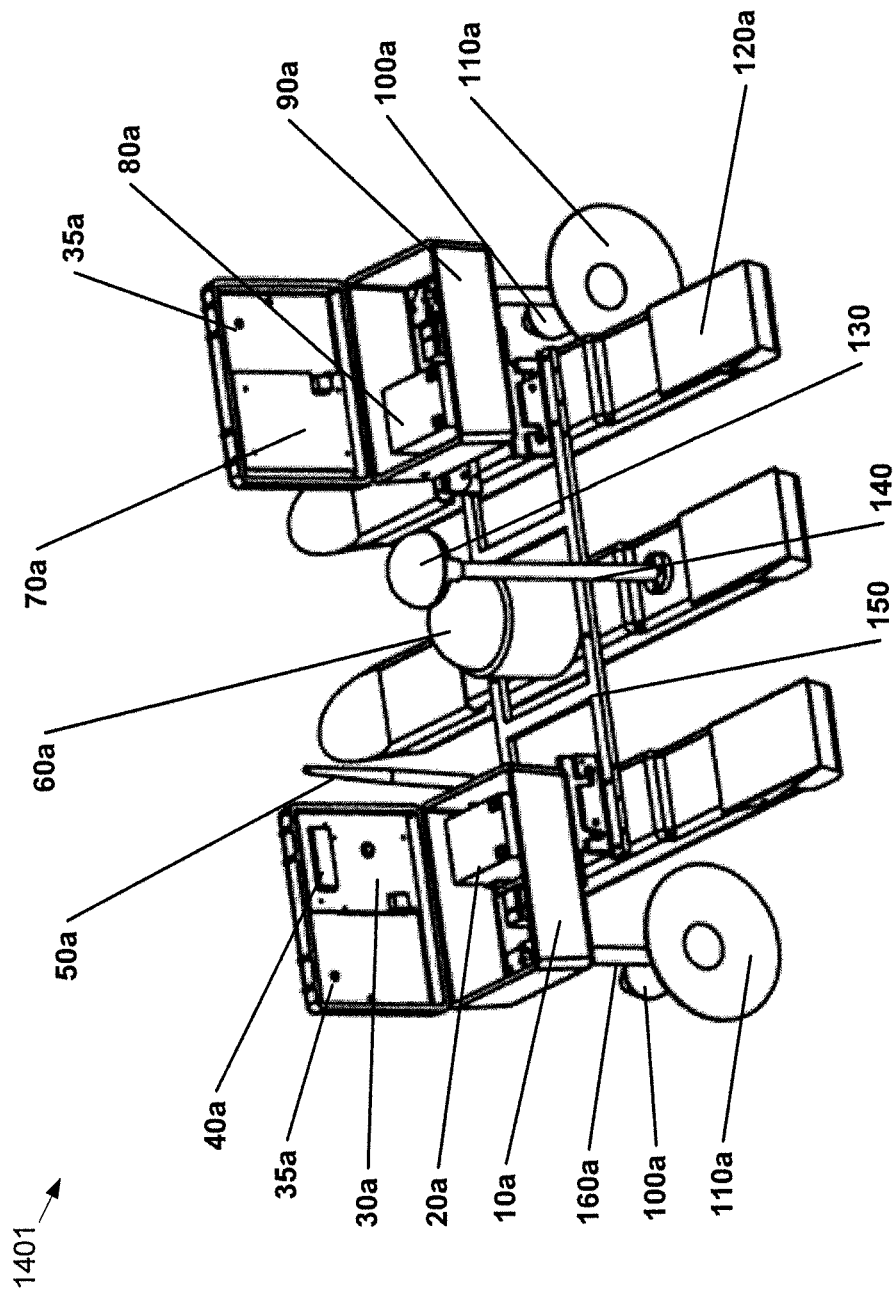
FIG. 14 depicts an aquatic unmanned platform 1401, according to non-limiting implementations.

For example, attention is next directed to FIG. 14 which depicts an aquatic unmanned platform 1401, according to non-limiting implementations. The aquatic unmanned platform 1401 comprises a hull 120a and attached framework 150a which provides a stable buoyant platform upon which the rest of the aquatic unmanned platform 1401 is mounted. A primary electrical enclosure 10a comprises the primary control board 30a and a primary battery 20a, while an auxiliary electrical enclosure 90a holds the auxiliary control board 70a and an auxiliary battery 80a. Attached via shafts 160a to both enclosures 10a, 90a are thruster assemblies 100a with appropriate propellers 110a for propelling the aquatic unmanned platform 1401 through an aquatic environment. A status display 40a and a long-range bidirectional communications system 50a can each be attached to the primary electrical enclosure 10a. A plurality of additional sensors such as a camera system 60a and a GPS system 130a may also be emplaced on the hull 120a. Sensors 60a, 130a may be mounted on mounts 140a if required. It is otherwise appreciated that aquatic unmanned platform 1401 comprises a control system similar to the system 301, and suitable associated modules.

Figure 15:
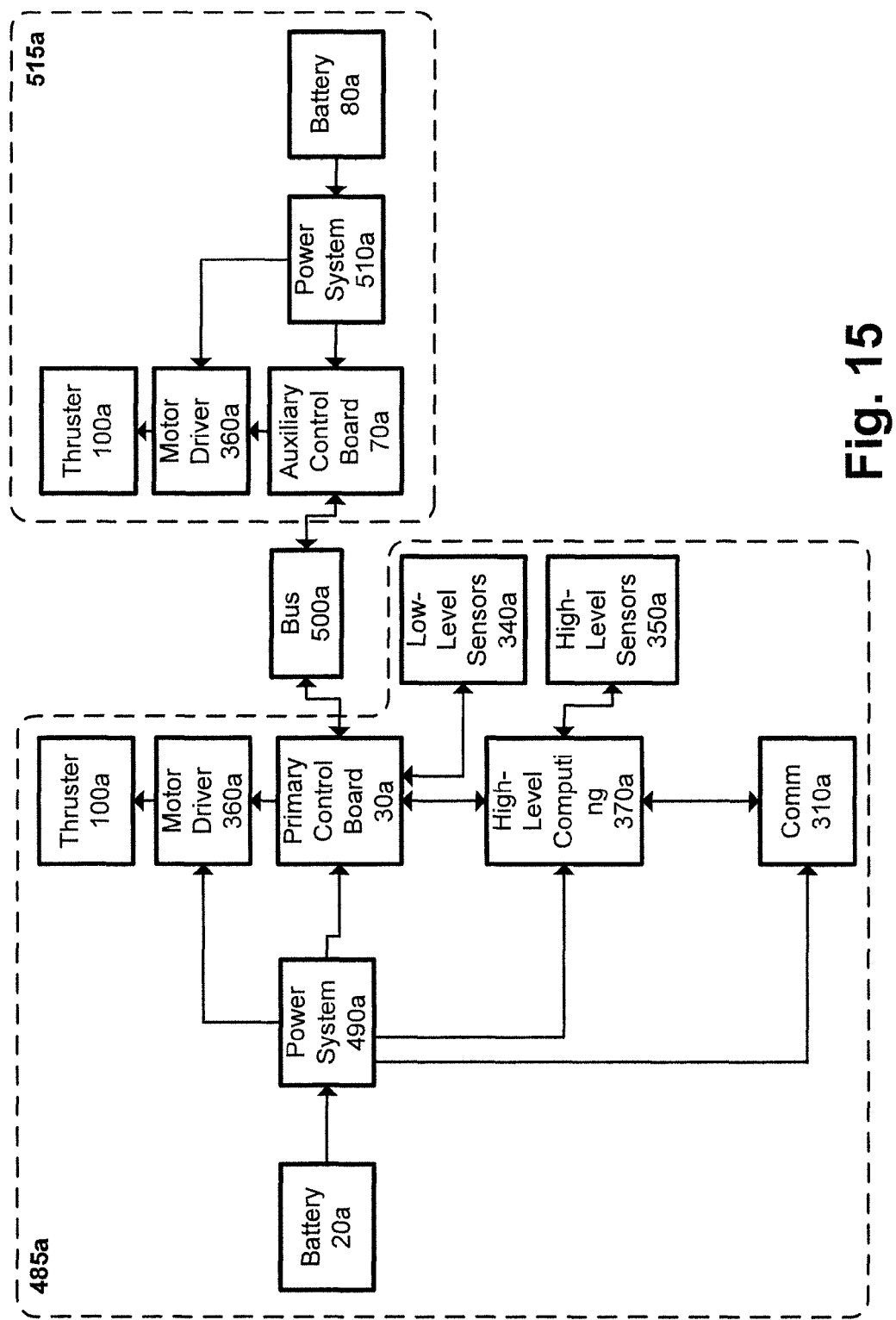
FIG. 15 depicts an electrical architecture of the unmanned aquatic vehicle of FIG. 14, according to non-limiting implementations

In particular attention is directed to FIG. 15 which depicts an electrical architecture of unmanned aquatic vehicle 1401, according to non-limiting implementations and represent an alternative architecture of parts of system 301. Separate control modules 485a, 515a are electrically connected via a suitable vehicle control network 500a. In each module 485a, 515a comprises a motor driver 36a0 and its associated thruster 100a. A primary module 485a is powered by a battery 2a which has its power filtered, monitored, and distributed by a power system 490a. Control of the system is done by the primary control board 30a, which itself receives information from low-level sensors 340a and communicates with other control modules via the vehicle control network 500a. The primary control board 30a can interface with the user and other sensors in any suitable manner. Auxiliary module 515a comprises a dedicated battery 80 and power system 510a, and is controlled aria an auxiliary control board 70a, which itself responds to commands over the vehicle control network 500a. Each power system 490a, 510a is enabled for self-monitoring and safety limiting, and can provide status updates as required to the relevant control board 30a, 70a of FIG. 14.

Those skilled in the art will appreciate that in some implementations, the functionality of system 301 can be implemented using pre-programmed hardware or firmware elements (e.g., application specific integrated circuits (ASICs), electrically erasable programmable read-only memories (EEPROMs), etc.), or other related components. In other implementations, the functionality of system 301 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The present specification should therefore not be limited by the above described embodiment, method, and examples, but by all embodiments and methods within the scope and spirit of the claims appended hereto.

What is claimed is:

1. A distributed hardware system for controlling a vehicle, comprising:
 a network;
 a central control module for controlling the distributed hardware system;
 a plurality of electronic hardware modules in communication with the central control module via the network, each of the plurality of electronic hardware modules enabled to:
  communicate with one another via the network;
  issue requests for information from the central control module via network;
  transmit data over the network in a common format to perform tasks respective to a respective function; and
  at least one of:
   independently sense one or more of a respective status of the distributed hardware system and at least one respective environmental parameter; and
   independently control the respective function of the vehicle, and at least a portion of the plurality of electronic hardware modules enabled to:
  be physically removed and physically inserted from the distributed hardware system as plug and play modules; and
  determine when at least one of the plurality of electronic hardware modules is physically removed or physically inserted from the distributed hardware system and transition to a corresponding state.

2. The distributed hardware system of claim 1, further comprising at least one power source.

3. The distributed hardware system of claim 2, wherein the at least one power source comprises at least two batteries and respective battery bins enabled to independently open such that a hot swap of a respective battery can be performed.

4. The distributed hardware system of claim 1, wherein the control module is enabled to control power to each of the plurality of electronic hardware modules.

5. The distributed hardware system of claim 4, further comprising at least a first power source powering the distributed hardware system and a second power source, wherein one or more of the control module and at least one of the plurality of electronic hardware modules is further enabled to:
 determine that the first power source is no longer able to power the distributed hardware system; and
 implement a power down transition in the distributed hardware system such that powering of the distributed hardware system is switched to the second power source and a hot swap sequence can be implemented to remove the first power source and insert a third power source.

6. The distributed hardware system of claim 5, wherein the power down transition comprises a motor power down transition.

7. The distributed hardware system of claim 5, wherein the one or more of the control module and at least one of the plurality of electronic hardware modules is further enabled to enter a low power state until the hot swap sequence occurs.

8. The distributed hardware system of claim 1, further comprising at least one sensor for sensing at least one of the respective status of the distributed hardware system and the at least one respective environmental parameter, wherein a respective one of the plurality of electronic hardware modules is enabled for communication with the at least one sensor.

9. The distributed hardware system of claim 1, wherein at least one of the plurality of electronic hardware modules comprises a motor amplifier module for controlling a motor of the vehicle.

10. The distributed hardware system of claim 1, wherein at least one of the plurality of electronic hardware modules comprises a radio frequency (RF) module enabled to receive command data from a remote control system, translate the command data to the common format and communicate translated command data over the network.

11. The distributed hardware system of claim 1, wherein at least one of the plurality of electronic hardware modules comprises a remote control receiver enabled to receive command data from an off-the-shelf remote control receiver, translate the command data to the common format and communicate translated commands over the network.

12. The distributed hardware system of claim 1, wherein at least one of the plurality of electronic hardware modules comprises a user interface module enabled to at least one of receive command data from an input device and convey system data to a user.

13. The distributed hardware system of claim 1, wherein the network comprises at least one of a vehicle control network and a communication bus.

14. The distributed hardware system of claim 1, further comprising at least one of a battery charging system and at least one motor.

15. The distributed hardware system of claim 1, wherein the central control module is enabled to communicate with a high level computing system via a control link.

16. The distributed hardware system of claim 1, wherein the central control module is enabled to store at least one of:
 system state information received from the plurality of electronic hardware modules;
 setting data;
 setpoint data; and
 a combination thereof.

* * * * *